(12) United States Patent
Krueger et al.

(10) Patent No.: US 6,609,568 B2
(45) Date of Patent: Aug. 26, 2003

(54) CLOSED-LOOP DRAWDOWN APPARATUS AND METHOD FOR IN-SITU ANALYSIS OF FORMATION FLUIDS

(75) Inventors: Volker Krueger, Celle (DE); Matthias Meister, Celle (DE); John M. Michaels, Houston, TX (US); Jaedong Lee, Houston, TX (US); Stanley C. Jones, Littleton, CO (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/910,209

(22) Filed: Jul. 20, 2001

(65) Prior Publication Data

US 2002/0112854 A1 Aug. 22, 2002

Related U.S. Application Data

(60) Provisional application No. 60/219,741, filed on Jul. 20, 2000.

(51) Int. Cl.$^7$ .............................................. E21B 49/10
(52) U.S. Cl. ............................ 166/250.07; 166/250.17; 166/66
(58) Field of Search .................. 166/250.01, 250.02, 166/250.07, 250.17, 66; 175/40, 48, 50; 73/152.02, 152.03, 152.05, 152.18, 152.19, 152.21, 152.22, 152.55, 152.51

(56) References Cited

U.S. PATENT DOCUMENTS

| | | | |
|---|---|---|---|
| 3,321,965 A | 5/1967 | Johnson et al. | 73/155 |
| 5,233,866 A | 8/1993 | Desbrandes | 73/155 |
| 5,703,286 A | * 12/1997 | Proett et al. | 73/152.05 |
| 5,708,204 A | 1/1998 | Kasap | 75/152.52 |
| 5,803,186 A | 9/1998 | Berger et al. | 175/50 |

FOREIGN PATENT DOCUMENTS

| | | |
|---|---|---|
| EP | 0 490 421 A1 | 6/1992 |
| EP | 0 520 903 A2 | 12/1992 |
| EP | 0698722 A2 | 2/1996 |

* cited by examiner

*Primary Examiner*—David Bagnell
*Assistant Examiner*—Jennifer R Dougherty
(74) *Attorney, Agent, or Firm*—Madan, Mossman & Sriram, P.C.

(57) ABSTRACT

An apparatus and method capable of incrementally decreasing the borehole pressure at a variable rate by controlling a test volume within the borehole. The system includes an incrementally controllable pump, closed loop feedback and a controller for drawing down the pressure of a test volume to a level just below formation pressure. This incremental drawdown system will significantly reduce the overall measurement time, thereby increasing drilling efficiency and safety.

29 Claims, 10 Drawing Sheets

CLOSED-LOOP DRAWDOWN APPARATUS AND METHOD FOR IN-SITU ANALYSIS OF FORMATION FLUIDS

RELATED APPLICATION

This application is related to a U.S. provisional application titled "Closed-Loop Drawdown Apparatus and Method for In-Situ Analysis for Formation Fluids" filed on Jul. 20, 2000, Ser. No. 60/219,741, and from which priority is claimed for the present application.

BACKGROUND OF THE INVENTION

1. Field of the Invention

This invention relates to the testing of underground formations or reservoirs. More particularly, this invention relates to a method and apparatus for isolating a downhole reservoir and testing the reservoir fluid.

2. Description of the Related Art

To obtain hydrocarbons such as oil and gas, boreholes are drilled by rotating a drill bit attached at a drill string end. A large proportion of the current drilling activity involves directional drilling, i.e., drilling deviated and horizontal boreholes to increase the hydrocarbon production and/or to withdraw additional hydrocarbons from the earth's formations. Modern directional drilling systems generally employ a drill string having a bottomhole assembly (BHA) and a drill bit at an end thereof that is rotated by a drill motor (mud motor) and/or by rotating the drill string. A number of downhole devices placed in close proximity to the drill bit measure certain downhole operating parameters associated with the drill string. Such devices typically include sensors for measuring downhole temperature and pressure, azimuth and inclination measuring devices and a resistivity-measuring device to determine the presence of hydrocarbons and water. Additional down-hole instruments, known as logging-while-drilling (LWD) tools, are frequently attached to the drill string to determine the formation geology and formation fluid conditions during the drilling operations.

Drilling fluid (commonly known as the "mud" or "drilling mud") is pumped into the drill pipe to rotate the drill motor, provide lubrication to various members of the drill string including the drill bit and to remove cuttings produced by the drill bit. The drill pipe is rotated by a prime mover, such as a motor, to facilitate directional drilling and to drill vertical boreholes. The drill bit is typically coupled to a bearing assembly having a drive shaft, which in turn rotates the drill bit attached thereto. Radial and axial bearings in the bearing assembly provide support to the radial and axial forces of the drill bit.

Boreholes are usually drilled along predetermined paths and the drilling of a typical borehole proceeds through various formations. The drilling operator typically controls the surface-controlled drilling parameters, such as the weight on bit, drilling fluid flow through the drill pipe, the drill string rotational speed and the density and viscosity of the drilling fluid to optimize the drilling operations. The downhole operating conditions continually change and the operator must react to such changes and adjust the surface-controlled parameters to optimize the drilling operations. For drilling a borehole in a virgin region, the operator typically has seismic survey plots which provide a macro picture of the subsurface formations and a pre-planned borehole path. For drilling multiple boreholes in the same formation, the operator also has information about the previously drilled boreholes in the same formation.

Typically, the information provided to the operator during drilling includes borehole pressure and temperature and drilling parameters, such as Weight-On-Bit (WOB), rotational speed of the drill bit and/or the drill string, and the drilling fluid flow rate. In some cases, the drilling operator also is provided selected information about the bottom hole assembly condition (parameters), such as torque, mud motor differential pressure, torque, bit bounce and whirl etc.

Downhole sensor data are typically processed downhole to some extent and telemetered uphole by sending a signal through the drill string, or by mud-pulse telemetry which is transmitting pressure pulses through the circulating drilling fluid. Although mud-pulse telemetry is more commonly used, such a system is capable of transmitting only a few (1–4) bits of information per second. Due to such a low transmission rate, the trend in the industry has been to attempt to process greater amounts of data downhole and transmit selected computed results or "answers" uphole for use by the driller for controlling the drilling operations.

Commercial development of hydrocarbon fields requires significant amounts of capital. Before field development begins, operators desire to have as much data as possible in order to evaluate the reservoir for commercial viability. Despite the advances in data acquisition during drilling using the MWD systems, it is often necessary to conduct further testing of the hydrocarbon reservoirs in order to obtain additional data. Therefore, after the well has been drilled, the hydrocarbon zones are often tested with other test equipment.

One type of post-drilling test involves producing fluid from the reservoir, shutting-in the well, collecting samples with a probe or dual packers, reducing pressure in a test volume and allowing the pressure to build-up to a static level. This sequence may be repeated several times at several different depths or point within a single reservoir and/or at several different reservoirs within a given borehole. One of the important aspects of the data collected during such a test is the pressure build-up information gathered after drawing the pressure down. From these data, information can be derived as to permeability, and size of the reservoir. Further, actual samples of the reservoir fluid must be obtained, and these samples must be tested to gather Pressure-Volume-Temperature and fluid properties such as density, viscosity and composition.

In order to perform these important tests, some systems require retrieval of the drill string from the borehole. Thereafter, a different tool, designed for the testing, is run into the borehole. A wireline is often used to lower the test tool into the borehole. The test tool sometimes utilizes packers for isolating the reservoir. Numerous communication devices have been designed which provide for manipulation of the test assembly, or alternatively, provide for data transmission from the test assembly. Some of those designs include mud-pulse telemetry to or from a downhole microprocessor located within, or associated with the test assembly. Alternatively, a wire line can be lowered from the surface, into a landing receptacle located within a test assembly, establishing electrical signal communication between the surface and the test assembly. Regardless of the type of test equipment currently used, and regardless of the type of communication system used, the amount of time and money required for retrieving the drill string and running a second test rig into the hole is significant. Further, if the hole is highly deviated, a wire line can not be used to perform the testing, because to test tool may not enter the hole deep enough to reach the desired formation.

A more recent system is desclosed in U.S. Pat. No. 5,803,186 to Berger et al. The '186 patent provides a MWD system that includes use of pressure and resistivity sensors with the MWD system, to allow for real time data transmission of those measurements. The '186 device allows obtaining static pressures, pressure build-ups, and pressure draws-downs with the work string, such as a drill string, in place. Also, computation of permeability and other reservoir parameters based on the pressure measurements can be accomplished without pulling the drill string.

The system described in the '186 patent decreases the time required to take a test when compared to using a wireline. However, the '186 patent does not provide an apparatus for improved efficiency when wireline applications are desirable. A pressure gradient test is one such test wherein multiple pressure tests are taken as a wireline conveys a test apparatus downward through a borehole. The purpose of the test is to determine fluid density in-situ and the interface or contact points between gas, oil and water when these fluids are present in a single reservoir.

Another apparatus method for measuring formation pressure and permeability is described in U.S. Pat. No. 5,233,866 issued to Robert Desbrandes, hereinafter the '866 patent. FIG. 1 is a reproduction of a figure from the '866 patent that shows a drawdown test method for determining formation pressure and permeability.

Referring to FIG. 1, the method includes reducing pressure in a flow line that is in fluid communication with a borehole wall. In Step 2, a piston is used to increase the flow line volume thereby decreasing the flow line pressure. The rate of pressure decrease is such that formation fluid entering the flow line combines with fluid leaving the flow line to create a substantially linear pressure decrease. A "best straight line fit" is used to define a straight-line reference for a predetermined acceptable deviation determination. The acceptable deviation shown is $2\pi$ from the straight line. Once the straight-line reference is determined, the volume increase is maintained at a steady rate. At a time $t_1$, the pressure exceeds the $2\pi$ limit and it is assumed that the flow line pressure being below the formation pressure causes the deviation. At $t_1$, the drawdown is discontinued and the pressure is allowed to stabilize in Step 3. At $t_2$, another drawdown cycle is started which may include using a new straight-line reference. The drawdown cycle is repeated until the flow line stabilizes at a pressure twice. Step 5 starts at $t_4$ and shows a final drawdown cycle for determining permeability of the formation. Step 5 ends at $t_5$ when the flow line pressure builds up to the borehole pressure Pm. With the flow line pressure equalized to the borehole pressure, the chance of sticking the tool is reduced. The tool can then be moved to a new test location or removed from the borehole.

A drawback of the '866 patent is that the time required for testing is too long due to stabilization time during the "mini-buildup cycles." In the case of a low permeability formation, the stabilization may take from tens of minutes to even days before stabilization occurs. One or more cycles following the first cycle only compound the time problem.

Still another known method for measuring permeability and other parameters of a formation and fluid is described in U.S. Pat. No. 5,708,204 issued to Ekrem Kasap, and assigned Western Atlas, hereinafter the '204 patent and incorporated herein by reference. The '204 patent describes a wireline method using a closed-loop system. One drawback to the '204 patent is that it is only useful in wireline applications. A significant advantage of the present invention apparatus and method is the use of a MWD tool. Another improvement of over the '204 patent is the use of varying draw-rates during a test as will be described in detail later.

Whether using wireline or MWD, the formation pressure and permeability measurement systems discussed above measure pressure by drawing down the pressure of a portion of the borehole to a point below the expected formation pressure in one step to a predetermined point well below the expected formation pressure or continuing the drawdown at an established rate until the formation fluid entering the tool stabilizes the tool pressure. Then the pressure is allowed to rise and stabilize by stopping the drawdown. The drawdown cycle may be repeated to ensure a valid formation pressure is being measured, and in some cases lost or corrupted data require retest. This is a time-consuming measurement process.

SUMMARY OF THE INVENTION

The present invention addresses some of the drawbacks described above by utilizing a closed-loop apparatus and method to perform formation pressure and permeability tests more quickly than the devices and methods described above. With quicker formation testing, more tests providing actual pressures and permeability may be provided to enhance well operation efficiency and safety.

The present invention provides an apparatus and method capable of creating a test volume within a borehole, and incrementally decreasing the pressure within the test volume at a variable rate to allow periodic measurements of pressure as the test volume pressure decreases. Adjustments to the rate of decrease are made before the pressure stabilizes thereby eliminating the need for multiple cycles. This incremental drawdown apparatus and method will significantly reduce overall measurement time, thereby increasing drilling efficiency and safety.

Further, an apparatus is provided for testing an underground formation parameter of interest such as a pressure during drilling operations. The apparatus has a drill string for drilling a well borehole. At least one extendable member is mounted on the drill string, and the at least one extendable member is selectively extendable into sealing engagement with the wall of the bore hole for isolating a portion of the annular space between the drill string and the borehole. A port in the drill string is exposable to formation fluid in the isolated annular space, and a fluid volume control device mounted within the drill string is in fluid communication with the port for incrementally reducing a pressure within the isolated portion. A sensor is operatively associated with the fluid volume control device for sensing at least one characteristic of the fluid.

In addition to the apparatus provided, a method is provided for testing an underground formation during drilling operations. The method comprises drilling a borehole with a drill string, isolating a portion of the annular space between the drill string and the borehole with at least one extendable member mounted on the drill string. The extendable member is brought into sealing engagement with the wall of the borehole, then a port disposed in the drill string is exposed to formation fluid in the isolated annular space. The method also included incrementally reducing pressure within the isolated portion of the annulus with a fluid volume control device mounted within the drill string, and sensing at least one characteristic of the fluid with a sensor.

A wireline apparatus is provided for determining an underground formation parameter of interest such as contact points. The apparatus has a tool disposed on a wireline used to lower the tool into a well borehole. At least one extendable member is mounted on the tool, and the at least one extendable member is selectively extendable into sealing engagement with the wall of the borehole for isolating a portion of the annular space between the tool and the borehole. A port in the tool is exposable to formation fluid in the isolated annular space, and a fluid volume control device mounted within the tool is in fluid communication with the port for incrementally reducing a pressure within the isolated portion. A sensor is operatively associated with the fluid volume control device for sensing at least one characteristic of the fluid.

BRIEF DESCRIPTION OF THE DRAWINGS

The novel features of this invention, as well as the invention itself, will be best understood from the attached drawings, taken along with the following description, in which similar reference characters refer to similar parts, and in which.

DESCRIPTION OF THE PREFERRED EMBODIMENT

Figure 2:
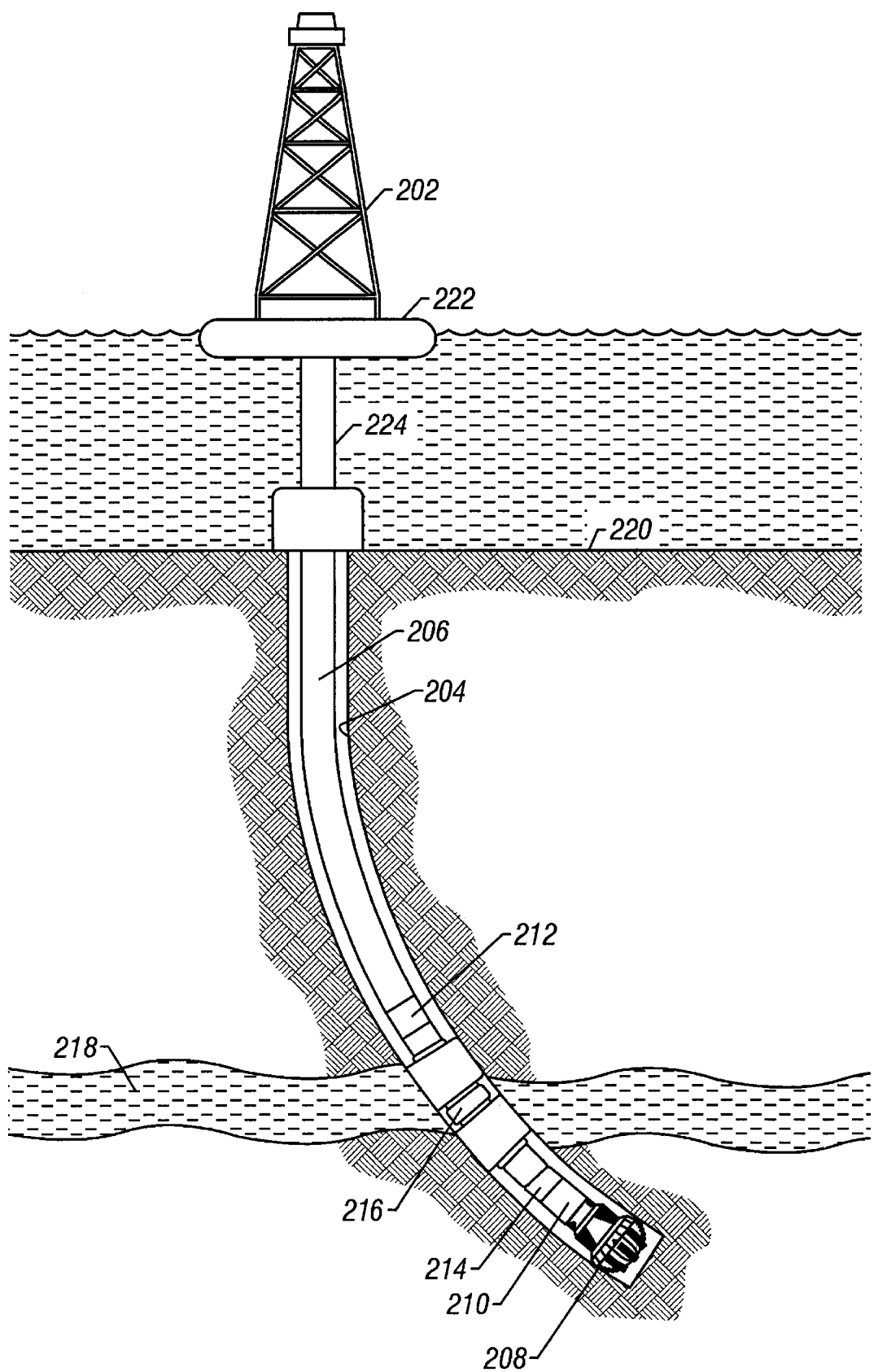
FIG. 2 is an elevation view of an offshore drilling system according to one embodiment of the present invention.

FIG. 2 is a drilling apparatus according to one embodiment of the present invention. A typical drilling rig 202 with a borehole 204 extending therefrom is illustrated, as is well understood by those of ordinary skill in the art. The drilling rig 202 has a work string 206, which in the embodiment shown is a drill string. The drill string 206 has attached thereto a drill bit 208 for drilling the borehole 204. The present invention is also useful in other types of work strings, and it is useful with a wireline, jointed tubing, coiled tubing, or other small diameter work string such as snubbing pipe. The drilling rig 202 is shown positioned on a drilling ship 222 with a riser 224 extending from the drilling ship 222 to the sea floor 220. However, any drilling rig configuration such as a land-based rig may be adapted to implement the present invention.

If applicable, the drill string 206 can have downhole drill motor 210. Incorporated in the drill string 206 above the drill bit 208 is a typical testing unit, which can have at least one sensor 214 to sense downhole characteristics of the borehole, the bit, and the reservoir, with such sensors being well known in the art. A useful application of the sensor 214 is to determine direction, azimuth and orientation of the drill string 206 using an accelerometer or similar sensor. The BHA also contains the formation test apparatus 216 of the present invention, which will be described in greater detail hereinafter. A telemetry system 212 is located in a suitable location on the work string 206 such as above the test apparatus 216. The telemetry system 212 is used for command and data communication between the surface and the test apparatus 216.

Figure 3:
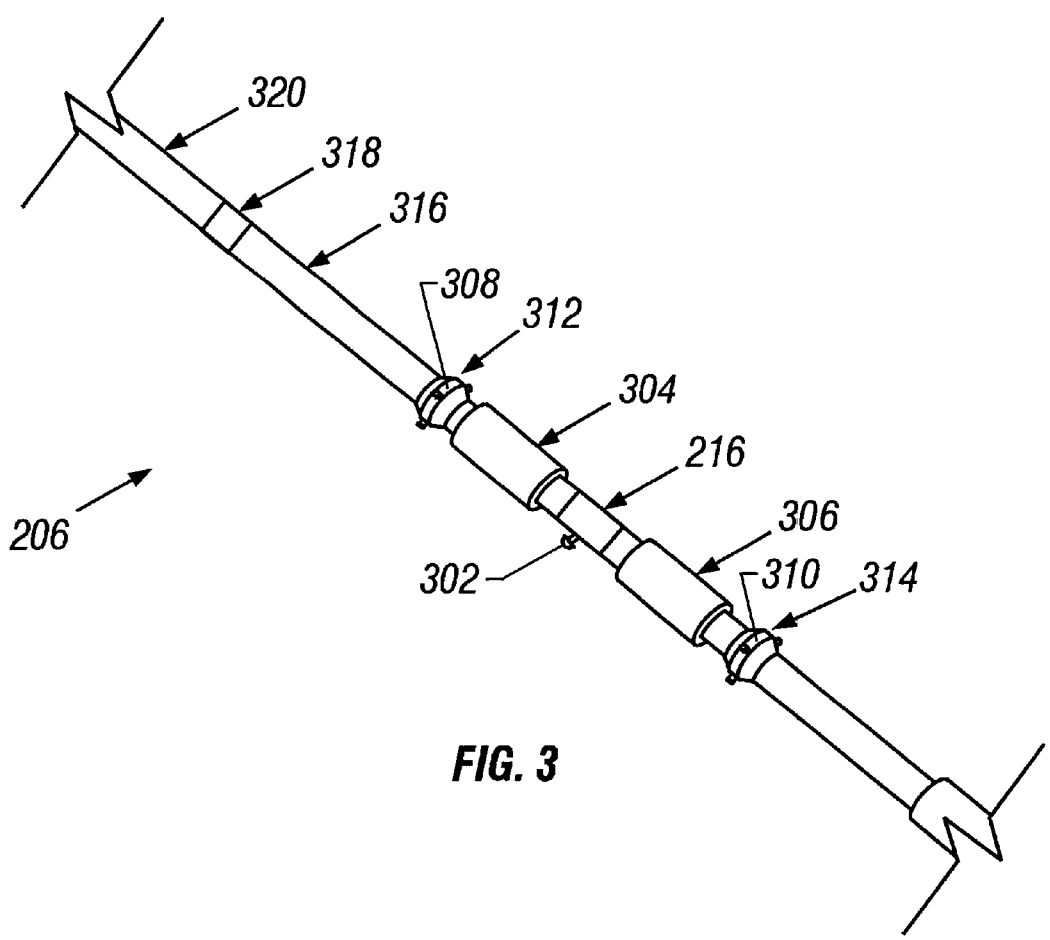
FIG. 3 shows a portion of drill string incorporating the present invention.

FIG. 3 is a section of drill string 206 incorporating the present invention. The tool section is preferably located in a BHA close to the drill bit (not shown). The tool includes communication unit and power supply 320 for two-way communication to the surface and supplying power to the downhole components. In the preferred embodiment, the tool requires a signal from the surface only for test initiation. A downhole controller and processor (not shown) carry out all subsequent control. The power supply may be a generator driven by a mud motor (not shown) or it may be any other suitable power source. Also included are multiple stabilizers 308 and 310 for stabilizing the tool section of the drill string 206 and packers 304 and 306 for sealing a portion of the annulus. A circulation valve disposed preferably above the upper packer 304 is used to allow continued circulation of drilling mud above the packers 304 and 306 while rotation of the drill bit is stopped. A separate vent or equalization valve (not shown) is used to vent fluid from the test volume between the packers 304 and 306 to the upper annulus. This venting reduces the test volume pressure, which is required for a drawdown test. It is also contemplated that the pressure between the packers 304 and 306 could be reduced by drawing fluid into the system or venting fluid to the lower annulus, but in any case some method of increasing the volume of the intermediate annulus to decrease the pressure will be required.

Figure 1:
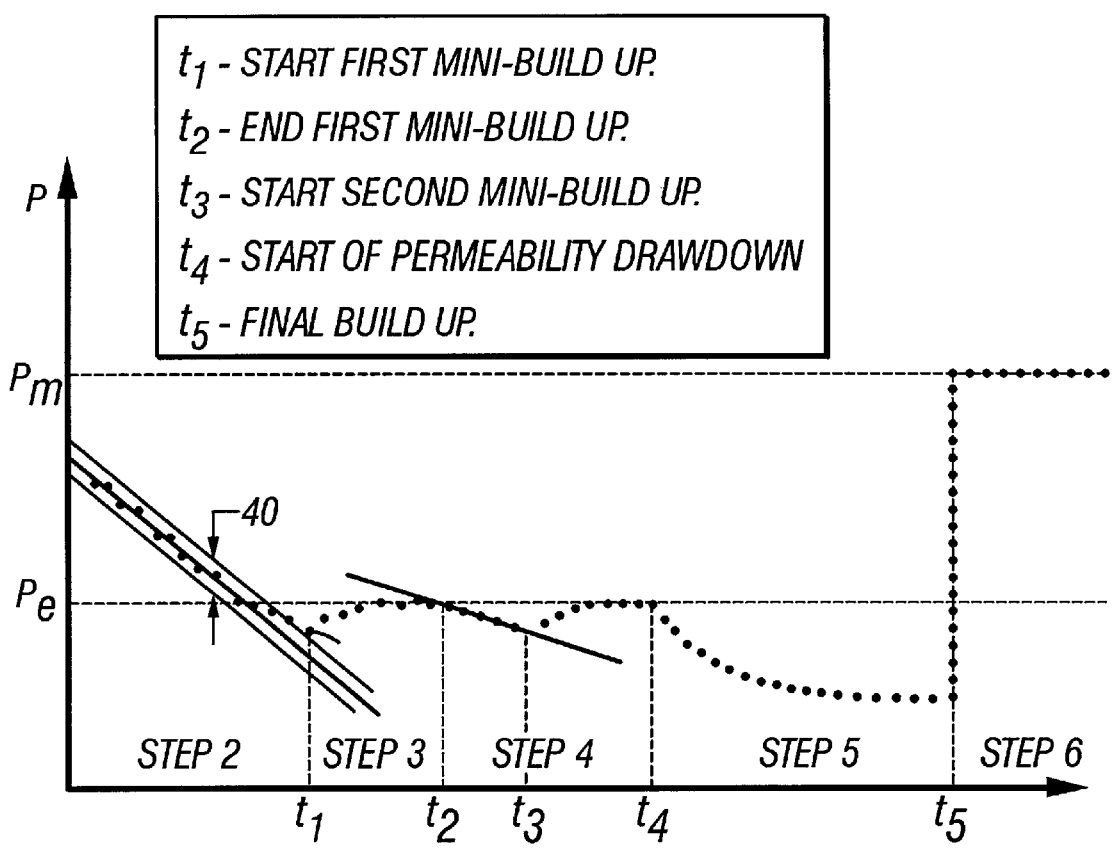
FIG. 1 is a graphical qualitative representation a formation pressure test using a particular prior art method.

In one embodiment of the present invention an extendable pad-sealing element 302 for engaging the well wall 4 (FIG. 1) is disposed between the packers 304 and 306 on the test apparatus 216. The pad-sealing element 302 could be used without the packers 304 and 306, because a sufficient seal with the well wall can be maintained with the pad 302 alone. If packers 304 and 306 are not used, a counterforce is required so pad 302 can maintain sealing engagement with the wall of the borehole 204. The seal creates a test volume at the pad seal and extending only within the tool to the pump rather than also using the volume between packer elements.

One way to ensure the seal is maintained is to ensure greater stability of the drill string 206. Selectively extendable gripper elements 312 and 314 could be incorporated into the drill string 206 to anchor the drill string 206 during the test. The grippers 312 and 314 are shown incorporated into the stabilizers 308 and 310 in this embodiment. The grippers 312 and 314, which would have a roughened end surface for engaging the well wall, would protect soft components such as the pad-sealing element 302 and packers 304 and 306 from damage due to tool movement. The grippers 312 would be especially desirable in offshore systems such as the one shown in FIG. 2, because movement caused by heave can cause premature wear out of sealing components.

Figure 4:
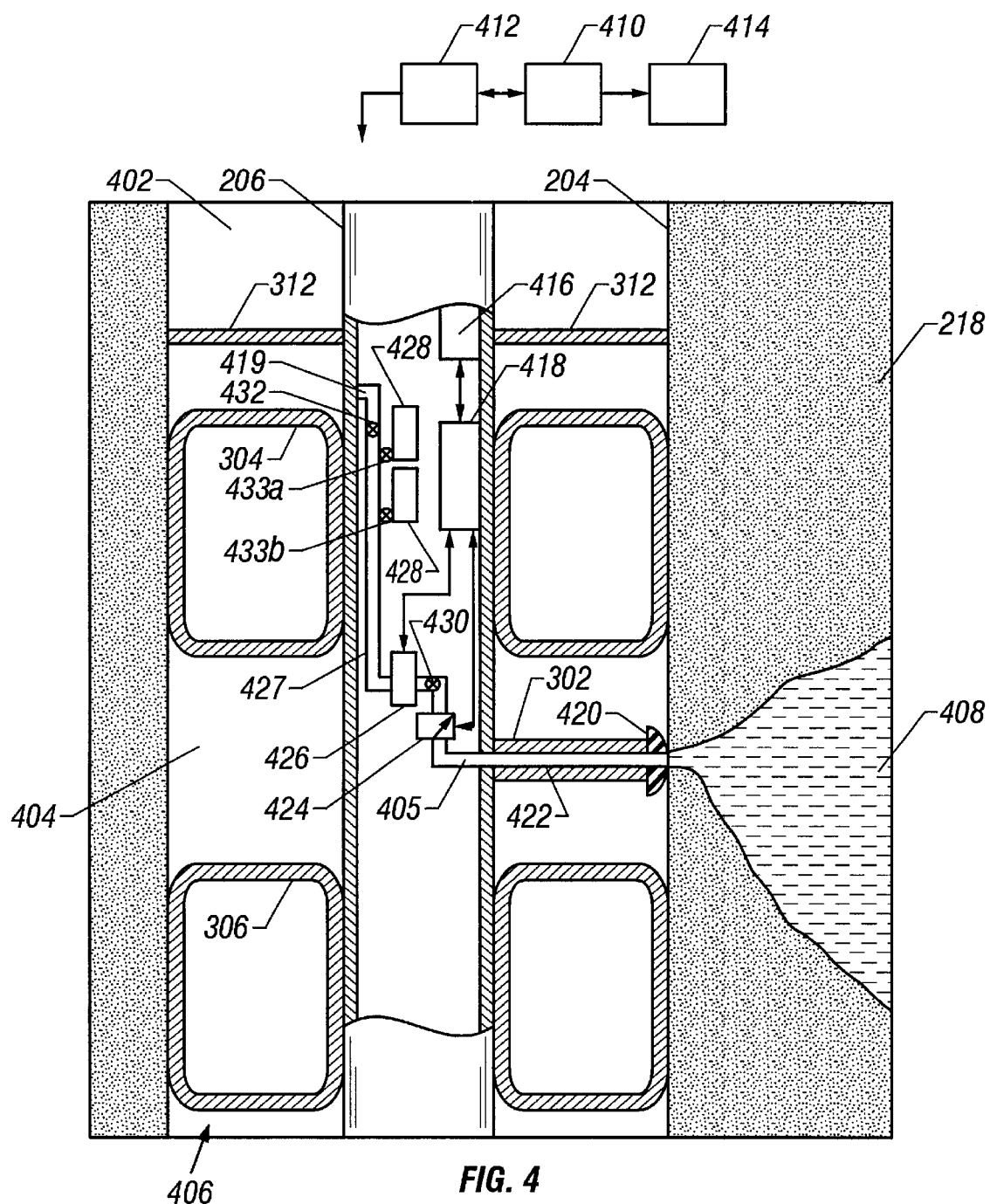
FIG. 4 is a system schematic of the present invention.

FIG. 4 shows the tool of FIG. 3 schematically with internal downhole and surface components. Selectively extendable gripper elements 312 engage the borehole wall 204 to anchor the drill string 206. Packer elements 304 and 306 well known in the art extend to engage the borehole wall 204. The extended packers separate the well annulus into three sections, and upper annulus 402, an intermediate annulus 404 and a lower annulus 406. The sealed annular section (or simply sealed section) 404 is adjacent a formation 218. Mounted on the drill string 206 and extendable into the sealed section 404 is the selectively extendable pad sealing element 302. A fluid line providing fluid communication between pristine formation fluid 408 and tool sensors such as pressure sensor 424 is shown extending through the pad member 302 to provide a port 420 in the sealed annulus 404. The preferable configuration to ensure pristine fluid is tested or sampled is to have packers 304 and 306 sealingly urged against the wall 204, and to have a sealed relationship between the wall and extendable element 302. Reducing the pressure in sealed section 404 prior to engaging the pad 302 will initiate fluid flow from the formation into the sealed section 404. With formation flowing when the extendable element 302 engages the wall, the port 420 extending through the pad 320 will be exposed to pristine fluid 408. Control of the orientation of the extendable element 302 is highly desirable when drilling deviated or horizontal wells. The preferred orientation is toward an upper portion of the borehole wall. A sensor 214, such as an accelerometer, can be used to sense the orientation of the extendable element 302. The extendable element can then be oriented to the desired direction using methods and not-shown components well known in the art such as directional drilling with a bend-sub. For example, the drilling apparatus may include a drill string 206 rotated by a surface rotary drive (not shown). A downhole mud motor (see FIG. 2 at 210) may be used to independently rotate the drill bit. The drill string can thus be rotated until the extendable element is oriented to the desired direction as indicated by the sensor 214. The surface rotary drive is halted to stop rotation of the drill string 206 during a test, while rotation of the drill bit may be continued using the mud motor if desired.

A downhole controller 418 preferably controls the test. The controller 418 is connected to at least one system volume control device (pump) 426. The pump 426 is a preferably small piston driven by a ball screw and stepper motor or other variable control motor, because of the ability to iteratively change the volume of the system. The pump 426 may also be a progressive cavity pump. When using other types of pumps, a flow meter should also be included. A valve 430 for controlling fluid flow to the pump 426 is disposed in the fluid line 422 between a pressure sensor 424 and the pump 426. A test volume 405 is the volume below the retracting piston of the pump 426 and includes the fluid line 422. The pressure sensor is used to sense the pressure within the test volume 404. It should be noted here that the test could be equally valuable if performed with the pad member 302 in a retracted position. In this case, the text volume includes the volume of the intermediate annulus 404. This allows for a "quick" test, meaning that no time for pad extension and retraction would be required. The sensor 424 is connected to the controller 418 to provide the feed back data required for a closed loop control system. The feedback is used to adjust parameter settings such as a pressure limit for subsequent volume changes. The downhole controller should incorporate a processor (not separately shown) for further reducing test time, and an optional database and storage system could be incorporated to save data for future analysis and for providing default settings.

When drawing down the sealed section 404, fluid is vented to the upper annulus 402 via an equalization valve 419. A conduit 427 connecting the pump 426 to the equalization valve 419 includes a selectable internal valve 432. If fluid sampling is desired, the fluid may be diverted to optional sample reservoirs 428 by using the internal valves 432, 433a, and 433b rather than venting through the equalization valve 419. For typical fluid sampling, the fluid contained in the reservoirs 428 is retrieved from the well for analysis.

A preferred embodiment for testing low mobility (tight) formations includes at least one pump (not separately shown) in addition to the pump 426 shown. The second pump should have an internal volume much less than the internal volume of the primary pump 426. A suggested volume of the second pump is $1/100$ the volume of the primary pump. A typical "T" connector having selection valve controlled by the downhole controller 418 may be used to connect the two pumps to the fluid line 422.

In a tight formation, the primary pump is used for the initial draw down. The controller switches to the second pump for operations below the formation pressure. An advantage of the second pump with a small internal volume is that build-up times are faster than with a pump having a larger volume.

Results of data processed downhole may be sent to the surface in order to provide downhole conditions to a drilling operator or to validate test results. The controller passes processed data to a two-way data communication system 416 disposed downhole. The downhole system 416 transmits a data signal to a surface communication system 412. There are several methods and apparatus known in the art suitable for transmitting data. Any suitable system would suffice for the purposes of this invention. Once the signal is received at the surface, a surface controller and a processor 410 converts and transfers the data to a suitable output or storage device 414. As described earlier, the surface controller 410 and surface communication system 412 is also used to send the test initiation command.

Figure 5:
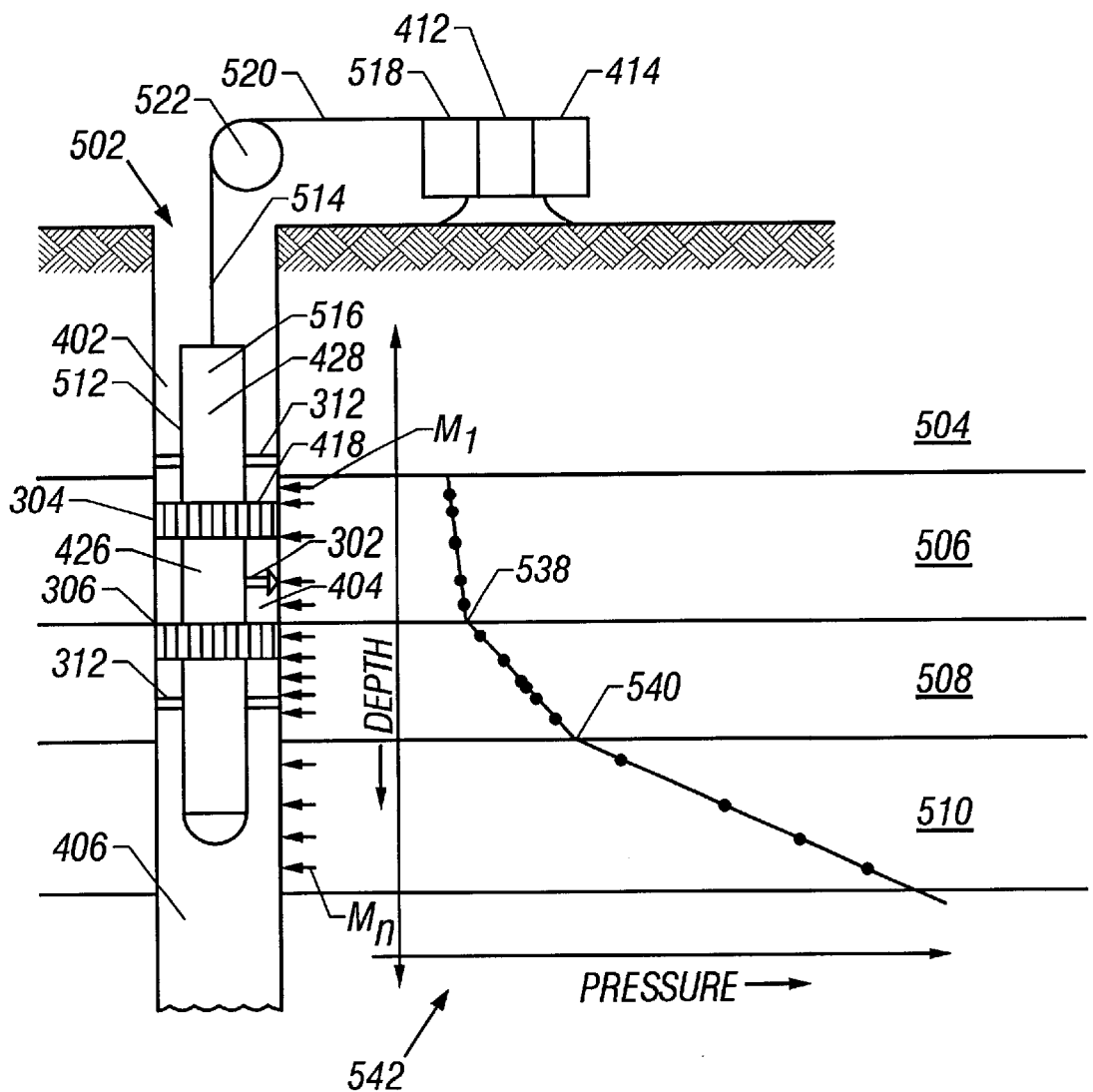
FIG. 5 is an elevation view of a wireline embodiment according to the present invention.

FIG. 5 is a wireline embodiment according to the present invention. A well 502 is shown traversing a formation 504 containing a reservoir having gas 506, oil 508 and water 510 layers. A wireline tool 512 supported by an armored cable 514 is disposed in the well 502 adjacent the formation 504. Extending from the tool 512 are optional grippers 312 for stabilizing the tool 512. Two expandable packers 304 and 306 are disposed on the tool 512 are capable of separating the annulus of the borehole 502 into an upper annulus 402, a sealed intermediate annulus 404 and a lower annulus 406. A selectively extendable pad member 302 is disposed on the tool 512. The grippers 312, packers 304 and 306, and extendable pad element 302 are essentially the same as those described in FIGS. 3 and 4, therefore the detailed descriptions are not repeated here.

Telemetry for the wireline embodiment is a downhole two-way communication unit 516 connected to a surface two-way communication unit 518 by one or more conductors 520 within the armored cable 514. The surface communication unit 518 is housed within a surface controller that includes a processor 412 and output device 414 as described in FIG. 4. A typical cable sheave 522 is used to guide the armored cable 514 into the borehole 502. The tool 512 includes a downhole processor 418 for controlling formation tests in accordance with methods to be described in detail later.

The embodiment shown in FIG. 5 is desirable for determining contact points 538 and 540 between the gas 506 and oil 508 and between the oil 508 and water 510. To illustrate this application a plot 542 of pressure vs. depth is shown superimposed on the formation 504. The downhole tool 512 includes a pump 426, a plurality of sensors 424 and optional sample tanks 428 as described above for the embodiment shown in FIG. 4. These components are used to measure formation pressure at varying depths within the borehole 502. The pressures plotted as shown are indicative of fluid or gas density, which varies distinctly from one fluid to the next. Therefore, having multiple pressure measurements $M_1$–$M_n$ provides data necessary to determine the contact points 538 and 540.

Measurement strategies and calculation procedures for determining effective mobility ($k/\mu$) in a reservoir according to the present invention are described below. Measurement times are fairly short, and calculations are robust for a large range of mobility values. The initial pressure drawdown employs a much lower pump withdrawal rate, 0.1 to 0.2 cm$^3$/s, than rates typically used currently. Using lower rates reduces the probability of formation damage due to fines migration, reduces temperature changes related to fluid expansion, reduces inertial flow resistance, which can be substantial in probe permeability measurements, and permits rapid attainment of steady-state flow into the probe for all but very low mobilities.

Steady state flow is not required for low mobility values (less than about 2 md/cp). For these measurements, fluid compressibility is determined form the initial part of the drawdown when pressure in the probe is greater than formation pressure. Effective mobility and distant formation pressure, p*, are determined from the early portion of the pressure buildup, by methods presented, thus eliminating the need for the lengthy final portion of the buildup in which pressure gradually reaches a constant value.

For higher mobilities, where steady-state flow is reached fairly quickly during the drawdown, the pump is stopped to initiate the rapid pressure buildup. For a mobility of 10 md/cp, and the conditions used for the sample calculations later herein (including a pump rate of 0.2 cm$^3$/s), steady-state flow occurs at a drawdown of about 54 psi below formation pressure. The following buildup (to within 0.01 psi of formation pressure) requires only about 6 seconds. The drawdown is smaller and the buildup time is shorter (both inversely proportional) for higher mobilities. Mobility can be calculated from the steady-state flowrate and the difference between formation and drawdown pressures. Different pump rates can be used to check for inertial flow resistance. Instrument modifications may be required to accommodate the lower pumps rates and smaller pressure differences.

Referring to FIG. 4, after the packers 304 and 306 are set and the pump piston is in its initial position with a full withdrawal stroke remaining, the pump 426 is started preferably using a constant rate ($q_{pump}$). The probe and connecting lines to the pressure gauge and pump comprise the "system volume," $V_{sys}$ which is assumed to be filled with a uniform fluid, e.g., drilling mud. As long as pressure in the probe is greater than the formation pressure, and the formation face at the periphery of the borehole is sealed by a mud cake, no fluid should flow into the probe. Assuming no leaks past the packer and no work-related expansional temperature decreases, pressure in the "system," at the datum of the pressure gauge, is governed by fluid expansion, equal to the pump withdrawal volume. Where $A_p$ is the cross sectional area of a pump piston, x is the travel distance of the piston, C is fluid compressibility, and p is system pressure, the rate of pressure decline depends on the volumetric expansion rate as shown in equation 1:

$$q_{pump} = A_p\left(\frac{dx}{dt}\right) = \frac{dV_p}{dt} = -CV_{sys}\left(\frac{dp}{dt}\right) \quad (1)$$

Equation 2 shows the system volume increases as the pump piston is withdrawn:

$$V_{sys}[t] = V_0 + (x[t]-x_0)A_p = V_0 + V_p[t] \quad (2)$$

and differentiation of Eq. 2 shows that:

$$\frac{dV_{sys}}{dt} = \frac{dV_p}{dt} \quad (3)$$

Therefore, substituting the results of Eq. 3 into Eq. 1 and rearranging:

$$\frac{-dV_{sys}}{CV_{sys}} \equiv \frac{-d\ln V_{sys}}{C} = dp \quad (4)$$

For constant compressibility, Eq. 4 can be integrated to yield pressure in the probe as a function of system volume:

$$P_n = P_{n-1} + \frac{1}{C}\ln\left[\frac{V_{sys_{n-1}}}{V_{sys_n}}\right]. \quad (5)$$

Pressure in the probe can be related to time by calculating the system volume as a function of time from Eq. 2. Conversely, if compressibility is not constant, its average value between any two system volume is:

$$C_{avg.} = \frac{\ln\left[\frac{V_{sys_{n-1}}}{V_{sys_n}}\right]}{P_2 - P_1} \quad (6)$$

where subscripts 1 and 2 are not restricted to being consecutive pairs of readings. Note that if temperature decreases during the drawdown, the apparent compressibility will be too low. A sudden increase in compressibility may indicate the evolution of gas or a leak past the packer. The calculation of compressibility, under any circumstances, is invalid whenever pressure in the probe is less than formation pressure: fluid can flow into the probe giving the appearance of a marked increase in compressibility. Note, however, that compressibility of real fluids almost invariably increases slightly with decreasing pressure.

Figure 6:
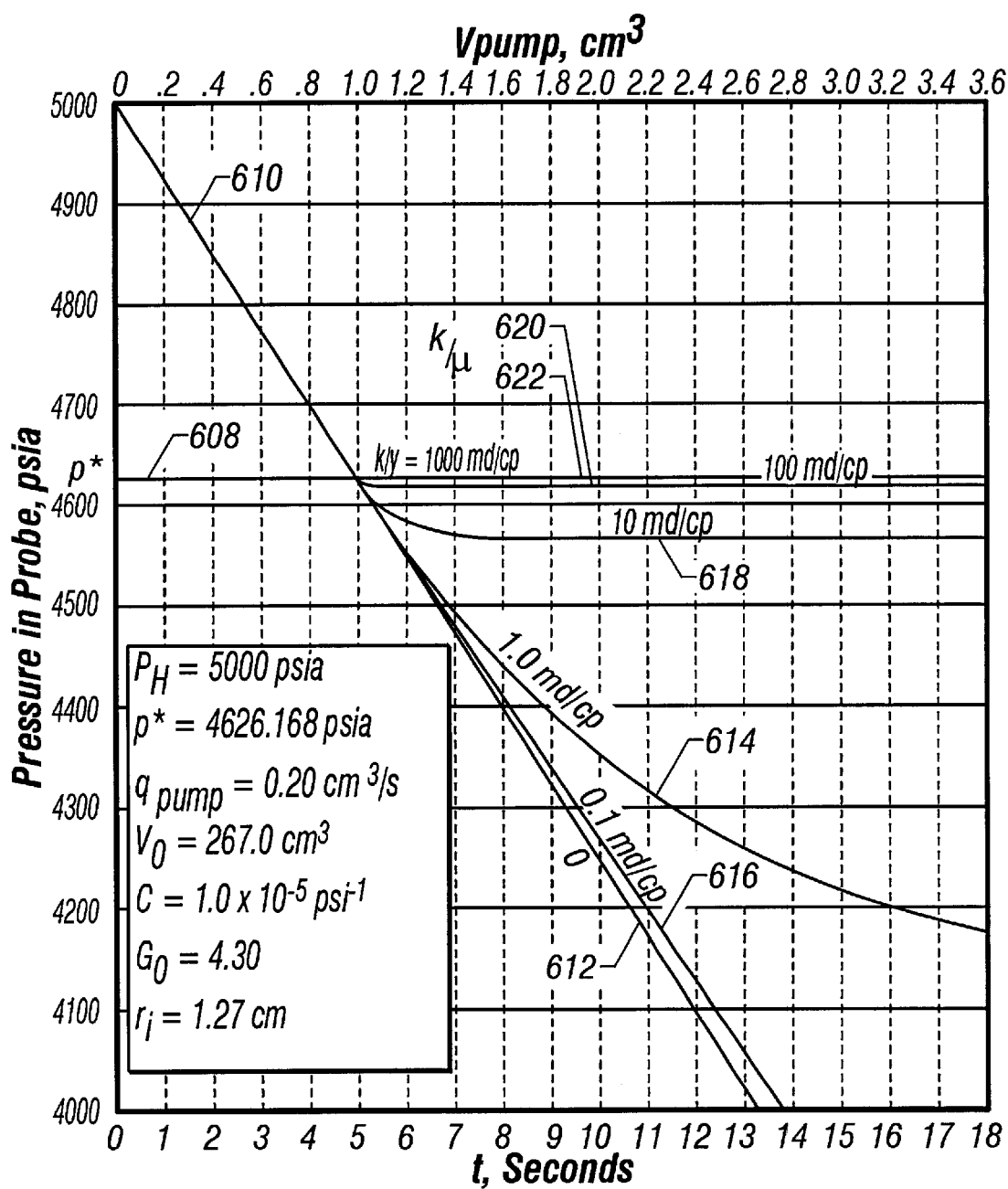
FIG. 6 is a plot graph of pressure vs. time and pump volume showing predicted drawdown behavior using specific parameters for calculation.

FIG. 6 shows an example of drawdown from an initial hydrostatic borehole pressure of 5000 psia to (and below) a reservoir pressure (p*) 608 of 4626.168 psia, calculated using the following conditions as an example:
Effective probe radius, $r_i$, of 1.27 cm;
Dimensionless geometric factor, $G_0$, of 4.30;
Initial system volume, $V_0$, of 267.0 cm$^3$;
Constant pump volumetric withdrawal rate $q_{pump}$ of 0.2 cm$^3$/s; and
Constant compressibility, C, of $1\times10^{-5}$ psi$^{-1}$.

The calculation assumes no temperature change and no leakage into the probe. The pressure drawdown is shown as a function of time or as a function of pump withdrawal volume, shown at the bottom and top of the figure respectively. The initial portion 610 of the drawdown (above p*) is calculated from Eq. 5 using $V_{sys}$ calculated from Eq. 2.

Continuing the drawdown below reservoir pressure for no flow into the probe is shown as the "zero" mobility curve 612. Note that the entire "no flow" drawdown is slightly curved, due to the progressively increasing system volume.

Normally, when pressure falls below p* and permeability is greater than zero, fluid from the formation starts to flow into the probe. When p=p* the flow rate is zero, but gradually increases as p decreases. In actual practice, a finite difference may be required before the mud cake starts to slough off the portion of the borehole surface beneath the interior radius of the probe packer seal. In this case, a discontinuity would be observed in the time-pressure curve, rather than the smooth departure from the "no flow" curve as shown in FIG. 6. As long as the rate of system-volume-increase (from the pump withdrawal rate) exceeds the rate of fluid flow into the probe, pressure in the probe will continue to decline. Fluid contained in $V_{sys}$ expands to fill the flow rate deficit. As long as flow from the formation obeys Darcy's law, it will continue to increase, proportionally to (p*-p). Eventually, flow from the formation becomes equal to the pump rate, and pressure in the probe thereafter remains constant. This is known as "steady state" flow. The equation governing steady state flow is:

$$\frac{k}{\mu} = \frac{14,696 q_{pump}}{G_0 r_i (p^* - p_{ss})} \tag{7}$$

For the conditions given for FIG. 6, the steady state drawdown pressure difference, p*-$p_{ss}$, is 0.5384 psi for k/$\mu$=1000 md/cp, 5.384 psi for 100 md/cp, 53.84 psi for 10 md/cp, etc. For a pump rate of 0.1 cm³/s, these pressure differences would be halved; and they would be doubled for a pump rate of 0.4 cm³/s, etc.

As will be shown later, these high mobility drawdowns have very fast pressure buildups after the pump-piston withdrawal is stopped. The value of p* can be found from the stabilized buildup pressure after a few seconds. In the case of high mobilities (k/$\mu$>50 md/cp), the pump rate may have to be increased in subsequent drawdown(s) to obtain an adequate drawdown pressure difference (p*-p). For lower mobilities, it should be reduced to ascertain that inertial flow resistance (non-Darcy flow) is not significant. A total of three different pump rates would be desirable in these cases.

Steady-state calculations are very desirable for the higher mobilities because compressibility drops out of the calculation, and mobility calculations are straight forward. However, instrument demands are high: 1) pump rates should be constant and easy to change, and 2) pressure differences (p*-$p_{ss}$) are small. It would be desirable to have a small piston driven by a ball screw and stepper motor to control pressure decline during the approach to steady state flow for low mobilities FIG. 6 shows that within the time period illustrated, the drawdown for the 1.0 md/cp curve 614 and lower mobilities did not reach steady state. Furthermore, the departures from the zero mobility curve for 0.1 md/cp 616 and below, are barely observable. For example, at a total time of 10 seconds, the drawdown pressure difference for 0.01 md/cp is only 1.286 psi less than that for no flow. Much greater pressure upsets than this, due to nonisothermal conditions or to small changes in fluid compressibility, are anticipated. Drawdowns greater than 200–400 psi below p* are not recommended: significant inertial flow resistance (non-Darcy flow) is almost guaranteed, formation damage due to fines migration is likely, thermal upsets are more significantly unavoidable, gas evolution is likely, and pump power requirements are increased.

During the period when p<p*, and before steady state flow is attained, three rates are operative: 1) the pump rate, which increases the system volume with time, 2) fluid flow rate from the formation into the probe, and 3) the rate of expansion of fluid within the system volume, which is equal to the difference between the first two rates. Assuming isothermal conditions, Darcy flow in the formation, no permeability damage near the probe face, and constant viscosity, drawdown curves for 10, 1, and 0.1 md/cp mobilities 618, 614 and 616, shown for FIG. 6, are calculated from an equation based on the relationship of these three rates as discussed above:

$$p_n = p_{n-1} + \frac{q_{f_n}(t_n - t_{n-1}) - (V_{pump_n} - V_{pump_{n-1}})}{C\left[V_0 + \frac{1}{2}(V_{pump_n} + V_{pump_{n-1}})\right]} \tag{8}$$

wherein, the flow rate into the probe from the formation at time step n, is calculated from:

$$q_{f_n} = \frac{kG_0 r_i \left[p^* - \frac{1}{2}(p_{n-1} + p_n)\right]}{14,696\mu} \tag{9}$$

Because $p_n$ is required for the calculation of $q_{f_n}$ in Eq. 9, which is required for the solution of Eq. 8, an iterative procedure was used. For the lower mobilities, convergence was rapid when using $P_{n-1}$ as the first guess for p. However, for the 10 md/cp curve, many more iterations were required for each time step, and this procedure became unstable for the 100 md/cp and higher mobility cases. Smaller time steps, and/or much greater damping (or a solver technique, rather than an iterative procedure) is required.

The pump piston is stopped (or slowed) to initiate the pressure buildup. When the piston is stopped, the system volume remains constant, and flow into the probe from the formation causes compression of fluid contained in the system volume and the consequent rise in pressure. For high mobility measurements, for which only steady-state calculations are performed, determination of fluid compressibility is not required. The buildup is used only to determine p*, so the pump is completely stopped for buildup. For the conditions given for FIG. 6, the buildup time, to reach within 0.01 psi of p* is about 6, 0.6, and 0.06 seconds for mobilities of 10, 100 and 1000 md/cp 618, 620 and 622, respectively.

For low mobility measurements, in which steady state was not reached during the drawdown, the buildup is used to determine both p* and k/$\mu$. However, it is not necessary to measure the entire buildup. This takes an unreasonable length of time because at the tail of the buildup curve, the driving force to reach p* approaches zero. A technique for avoiding this lengthy portion of the measurement will be presented in the next section.

The equation governing the pressure buildup, assuming constant temperature, permeability, viscosity, and compressibility, is:

$$\frac{kG_0 r_i (p^* - p)}{14,696\mu} = -CV_{sys}\left(\frac{dp}{dt}\right). \tag{10}$$

Rearranging and integrating yields:

$$t - t_0 = \frac{14{,}696 \mu C V_{sys}}{k G_0 r_i} \ln\left(\frac{p^* - p_0}{p^* - p}\right). \tag{11}$$

where $t_0$ and $p_0$, are the time and pressure in the probe, respectively, at the start of the buildup, or at any arbitrary point in the buildup curve.

Figure 7:
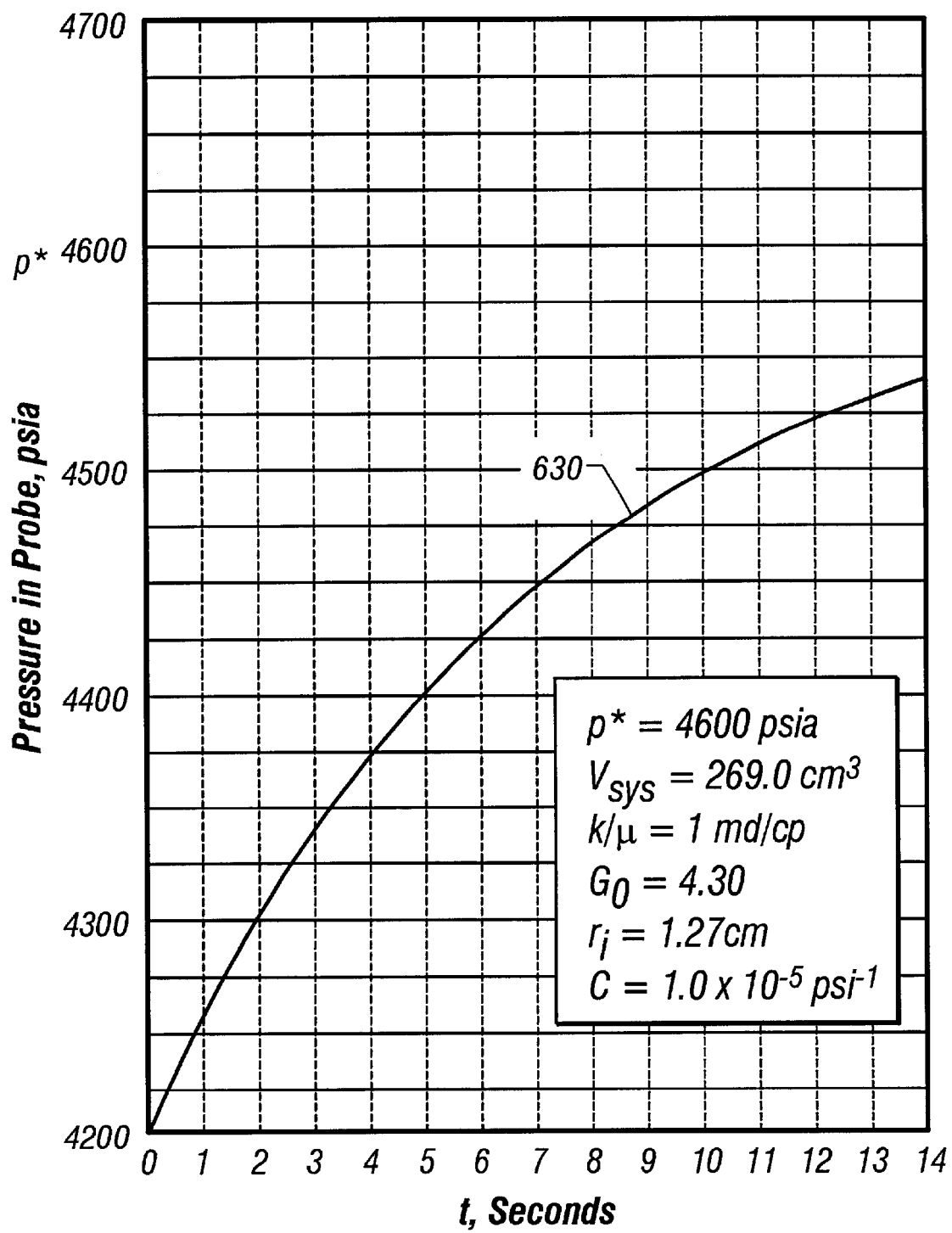
FIG. 7 is a plot graph of pressure vs. time showing the early portion of a pressure buildup curve for a moderately low permeability formation.

FIG. 7 is a plot of the early portion of a buildup curve 630 for a 1 md/cp mobility, which starts at 4200 psia, and if run to completion, would end at a p* of 4600. This is calculated from Eq. 11. In addition to the other parameters shown on this figure, $p_0$=4200 psia.

Determining p* from an incomplete buildup curve can be described by way of an example. Table 2 represents hypothetical experimental data, and may be the only data available. The challenge is to determine accurately the value of p*, which would not otherwise be available. To obtain p* experimentally would have taken at least 60 s, instead of the 15 s shown. The only information known in the hypothetical are the system values for FIG. 6 and $V_{sys}$ of 269.0 cm$^3$. The compressibility, C, is determined from the initial drawdown data starting at the hydrostatic borehole pressure, using Eq. 6.

TABLE 2

Hypothetical Pressure Buildup Data From
A Moderately Low Permeability Reservoir

| t-t$_0$, s | p, psia | t-t$_0$, s | p, psia |
|---|---|---|---|
| 0.0000 | 4200 | 7.1002 | 4450 |
| 0.9666 | 4250 | 8.4201 | 4475 |
| 2.0825 | 4300 | 10.0354 | 4500 |
| 3.4024 | 4350 | 12.1179 | 4525 |
| 5.0177 | 4400 | 15.0531 | 4550 |
| 5.9843 | 4425 | | |

The first group on the right side of Eq. 11 and preceding the logarithmic group can be considered the time constant, $\tau$, for the pressure buildup. Thus, using this definition, and rearranging Eq. 11 yields:

$$\ln\left(\frac{p^* - p_0}{p^* - p}\right) = \left(\frac{1}{\tau}\right)(t - t_0), \tag{12}$$

Figure 8:
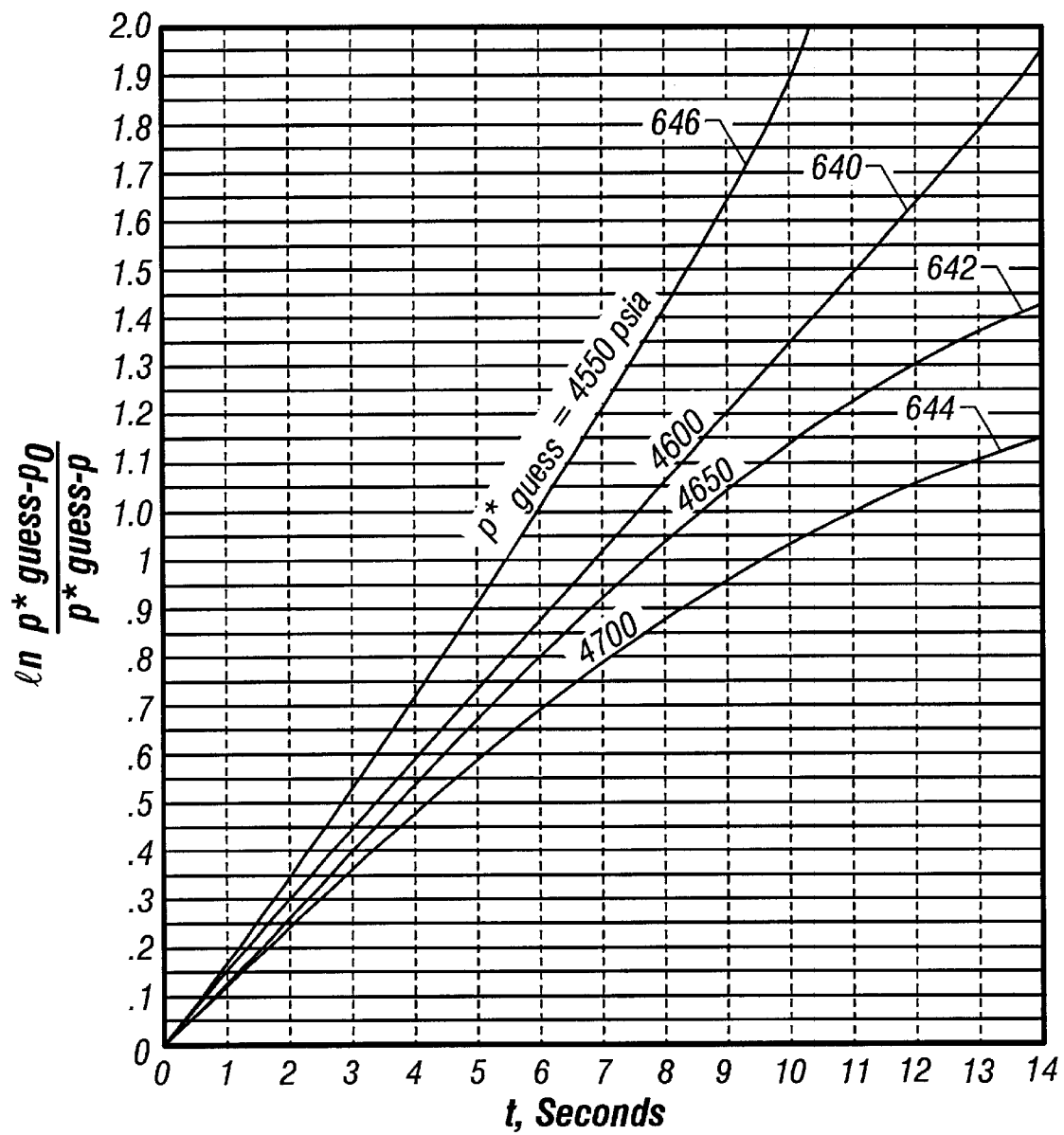
FIG. 8 is a plot graph of a method using iterative guesses for determining formation pressure.

A plot of the left side of Eq. 12 vs. (t–t$_0$) is a straight line with slope equal to (1/$\tau$), and intercept equal to zero. FIG. 8 is a plot of data from Table 2, using Eq. 12 with various guesses for the value of p*. We can see that only the correct value, 4600 psia, yields the required straight line 640. Furthermore, for guesses that are lower than the correct p*, the slope of the early-time portion of a curve 646 is smaller than the slope at later times. Conversely, for guesses that are too high, the early-time slope is larger than late-time slopes for the curves 642 and 644.

These observations can be used to construct a fast method for finding the correct p*. First, calculate the average slope from an arbitrary early-time portion of the data shown in Table 2. This slope calculation starts at t$_1$, and p$_1$, and ends at t$_2$ and p$_2$. Next calculate the average late-time slope from a later portion of the table. The subscripts for beginning and end of this calculation would be 3 and 4, respectively. Next divide the early-time slope by the late-time slope for a ratio R:

$$R = \frac{\ln\left(\frac{p^* - p_1}{p^* - p_2}\right)(t_4 - t_3)}{\ln\left(\frac{p^* - p_3}{p^* - p_4}\right)(t_2 - t_1)} \tag{13}$$

Figure 9:
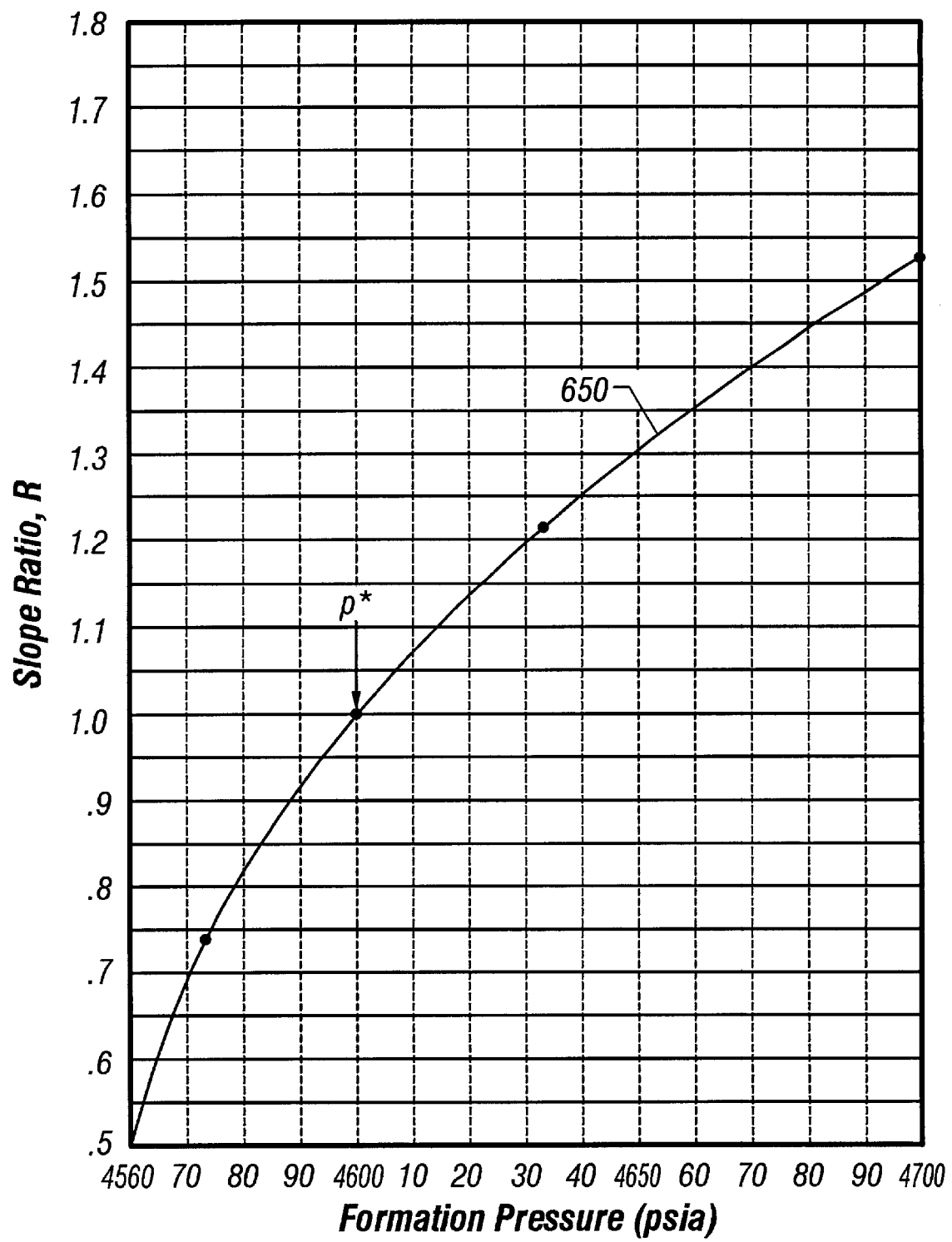
FIG. 9 is a plot graph of a method for finding formation pressure using incomplete pressure buildup data.

Suppose we choose the second set of data points from Table 2: 2.0825 s and 4300 psia for the beginning of the early-time slope. Suppose further that we select data from sets 5, 9, and 11 as the end of the early time slope, and beginning and end of the late-time slope, respectively, with corresponding subscripts 2, 3, and 4. If we now guess that p* is 4700 psia, then insert these numbers into Eq. 13, the calculated value of R is 1.5270. Because this is greater than 1, the guess was too high. Results of this and other guesses for p* while using the same data above are shown as a curve plot 650 in FIG. 9. The correct value of p*, 4600 psia, occurs at R=1. These calculations can easily be incorporated into a solver routine, which converges rapidly to the correct p* without plots. Mobility, having found the correct p*, is calculated from a rearrangement of Eq. 11, using the compressibility obtained from the initial hydrostatic drawdown.

In general, for real data, the very early portion of the buildup data should be avoided for the calculations of p*, then k/$\mu$. This fastest portion of the buildup, with high pressure differences, has the greatest thermal distortion due to compressive heating, and has the highest probability of non-Darcy flow. After p* has been determined as described above, the entire data set should be plotted per FIG. 7. Whenever the initial portion of the plot displays an increasing slope with increasing time, followed by a progressively more linear curve, this may be a strong indication of non-Darcy flow at the higher pressure differences.

Figure 10:
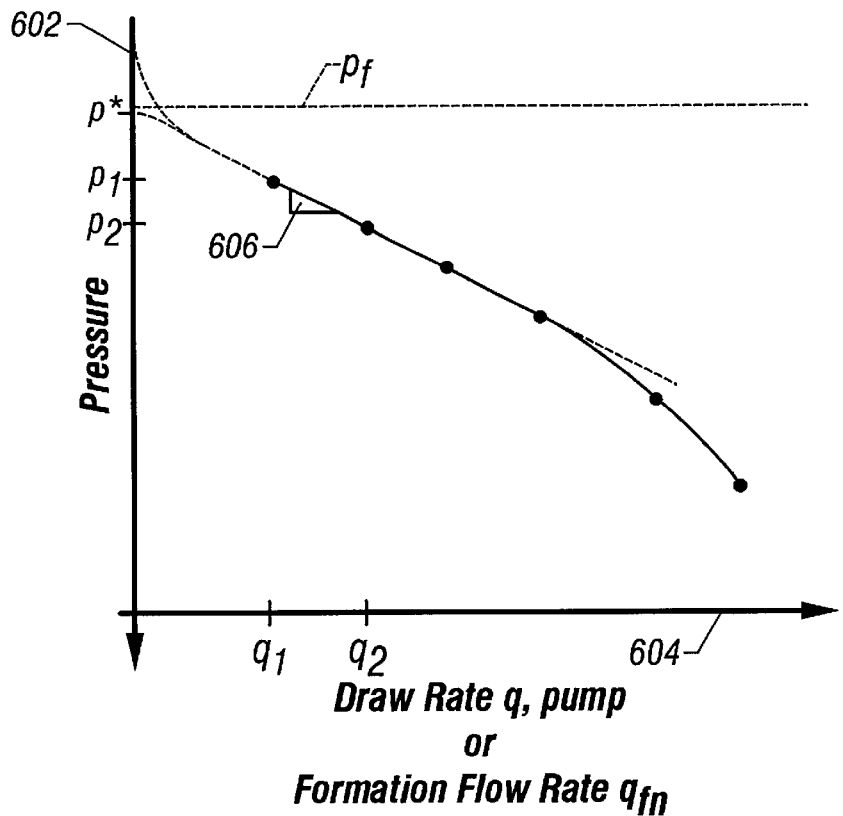
FIG. 10 is a plot graph of pressure vs. draw rate illustrating a computation technique used in a method according to the present invention to determine formation pressure.

Another method according to the present invention can be described with reference to FIG. 10. FIG. 10 shows a relationship between tool pressure 602 and formation flow rate $q_{fn}$ 604 along with the effect of rates below and above certain limits. Darcy's Law teaches that pressure is directly proportional to fluid flow rate in the formation. Thus, plotting pressure against a drawdown piston draw rate will form a straight line when the pressure in the tool is constant while the piston is moving at a given rate. Likewise, the plot of flow rates and stabilized pressures will form a straight line, typically with a negative slope (m) 606, between a lower and an upper rate limit. The slope is used to determine mobility (k/$\mu$) of fluid in the formation. Equation 8 can be rearranged for the formation flow rate:

$$q_{fn} = \frac{(V_{pump_n} - V_{pump_{n-1}}) - C\left[V_0 + \frac{1}{2}(V_{pump_n} + V_{pump_{n-1}})\right](p_{n-1} - p_n)}{(t_n - t_{n-1})} \tag{14}$$

Equation 14 is valid for non-steady-state conditions as well as steady-state conditions. Formation flow rate $q_{fn}$ can be calculated using Eq. 14 for non-steady-state conditions when C is known reasonably accurately to determine points along the plot of FIG. 10.

Steady-state conditions will simplify Eq. 14 because $(p_{n-1}-p_n)=0$. Under steady state conditions, and only steady-state conditions, known tool parameters and measured values may be used to determine points along the straight line region of FIG. 10. In this region, the pump rate $q_{pump}$ can be substituted. Then using $q_{pump}$ in equation 9 yields:

$$\frac{k}{\mu} = \frac{-14696}{mG_0 r_i} \quad (15)$$

In Eq. 15, $m=(p^*-p_{ss})/q_{pump}$. The units for $k/\mu$ are in md/cp, $p_n$ and $p^*$ are in psia, $r_i$ is in cm, $q_{fn}$ is in cm$^3$/s, $V_{pump}$ and $V_0$ are in cm$^3$, C is in psi$^{-1}$, and t is in s. Each pressure on the straight line is a steady state pressure at the given flow rate (or draw rate).

In practice, a deviation from a straight line near zero formation flow rate (filtrate) may be an indicator of drilling mud leakage into the tool (flow rate approximately zero). The deviation at high flow rates is typically a non-Darcy effect. However, the formation pressure can be determined by extending the straight line to an intercept with zero draw rate. The calculated formation pressure $p^*$ should equal a measured formation pressure within a negligible margin of error.

The purpose of a pressure test is to determine the pressure in the reservoir and determine the mobility of fluid in that reservoir. A procedure adjusting the piston draw rate until the pressure reading is constant (zero slope) provides the necessary information to determine pressure and mobility independently of a "stable" pressure build up using a constant volume.

Some advantages of this procedure are quality assurance through self-validation of a test where a stable build up pressure is observed, and quality assurance through comparison of drawdown mobility with build up mobility. Also, when a build up portion of a test is not available (in the cases of lost probe seal or excessive build up time), $p^*$ provides the formation pressure.

Figure 11:
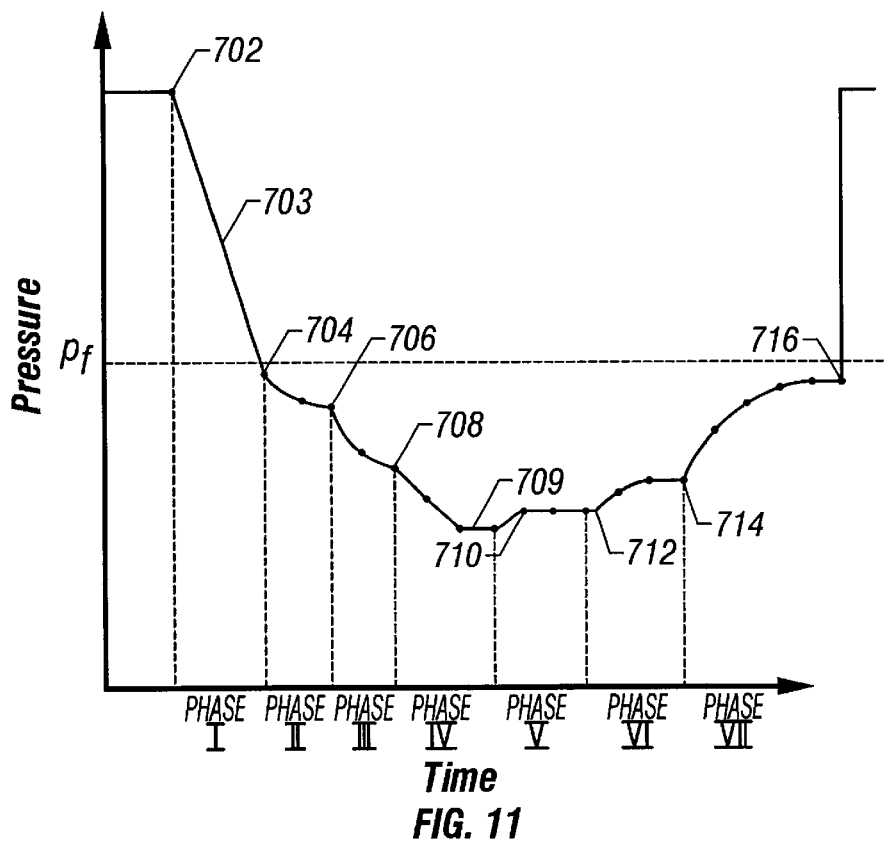
FIG. 11 is a graphical representation illustrating a method according to the present invention.

FIG. 11 is an exemplary plot of tool pressure vs. time using another method according to the present invention. The plot illustrates a method that involves changing the drawdown piston draw rate based on the slope of the pressure-time curve. Sensor data acquired at any point can be used with Eq. 14 to develop a plot as in FIG. 10 or used in automated solver routines controlled by a computer. Data points defining steady state pressures at various flow rates can be used to validate tests.

The procedure begins by using a MWD tool as described in FIG. 4 or a wireline tool as described in FIG. 5. A tool probe 420 is initially sealed against the borehole and the test volume 405 contains essentially only drilling fluid at the hydrostatic pressure of the annulus. Phase I 702 of the test is initiated by a command transmitted from the surface. A downhole controller 418 preferably controls subsequent actions. Using the controller to control a drawdown pump 426 that includes a drawdown piston, the pressure within the test volume is decreased at a constant rate by setting the draw rate of the drawdown piston to a predetermined rate. Sensors 424 are used to measure at least the pressure of the fluid in the tool at predetermined time intervals. The predetermined time intervals are adjusted to ensure at least two measurements can be made during each phase of the procedure. Additional advantages are gained by measuring the system volume, temperature and/or the rate of system volume change with suitable sensors. Compressibility of the fluid in the tool is determined during Phase 1 using the calculations discussed above.

Phase II of the test 704 begins when the tool pressure drops below the formation pressure $p^*$. The slope of the pressure curve changes due to formation fluid beginning to enter the test volume. The change in slope is determined by using a downhole processor to calculate a slope from the measurements taken at two time intervals within the Phase. If the draw rate were held constant, the tool pressure would tend to stabilize at a pressure below $p^*$.

The draw rate is increased at a predetermined time 706 to begin Phase 3 of the test. The increased draw rate reduces the pressure in the tool. As the pressure decreases, the flow rate of formation fluid into the tool increases. The tool pressure would tend to stabilize at a tool pressure lower than the pressure experienced during Phase II, because the draw rate is greater in Phase III than in Phase II. The draw rate is decreased again at a time 708 beginning Phase IV of the test when interval measurements indicate that pressure in the tool is approaching stabilization.

The draw rate may then be slowed or stopped so that pressure in the tool begins building. The curve slope changes sign when pressure begins to increase, and the change initiates Phase V 710 where the draw rate is then increased to stabilize the pressure. The stabilized pressure is indicated when pressure measurements yield zero slope. The drawdown piston rate is then decreased for Phase VI 712 to allow buildup until the pressure again stabilizes. When the pressure is stabilized, the drawdown piston is stopped at Phase VII 714, and the pressure within the tool is allowed to build until the tool pressure stabilizes at the formation pressure $p_f$. The test is then complete and the controller equalizes the test volume 716 to the hydrostatic pressure of the annulus. The tool can then be retracted and moved to a new location or removed from the borehole.

Stabilized pressures determined during Phase V 710 and Phase VI, 712 along with the corresponding piston rates, are used by the downhole processor to determine a curve as in FIG. 10. The processor calculates formation pressure $p^*$ from the measured data points. The calculated value $p^*$ is then compared to measured formation pressure $p_f$ obtained by the tool during Phase VII 714 of the test. The comparison serves to validate the measured formation pressure $p_f$ thereby eliminating the need to perform a separate validation test.

Other embodiments using one or more of the method elements discussed above are also considered within the scope of this invention. Still referring to FIG. 11, another embodiment includes Phase I through Phase IV and then Phase VII. This method is desirable with moderately permeable formations when it is desired to measure formation pressure. Typically, there would be a slight variation in the profile for Phase IV in this embodiment. Phase VII would be initiated when measurements show a substantially zero slope on the pressure curve 709. The equalizing procedure 716 would also be necessary before moving the tool.

Another embodiment of the present invention includes Phase I 702, Phase II 704, Phase VI 712, Phase VII 714 and the equalization procedure 716. This method is used in very low permeability formations or when the probe seal is lost. Phase II would not be as distinct a deviation as shown, so the straight line portion 703 of Phase I would seem to extend well below the formation pressure $p_f$.

While the particular embodiments as herein shown and disclosed in detail are fully capable of providing the advantages hereinbefore stated, it is to be understood that this disclosure is merely illustrative of the presently preferred embodiments of the invention and that no limitations are intended other than as described in the appended claims.

We claim:

1. A method for determining at least one parameter of interest of a formation comprising:
   (a) conveying a tool into a borehole on a work string, the borehole traversing a subterranean formation containing formation fluid under pressure, the borehole and work string having an annulus between the borehole wall and work string, the annulus being filled with a pressurized fluid containing the formation fluid;
(b) sealing a portion of the annulus by extending at least one selectively extendable device disposed on the tool;
(c) exposing a port to the sealed portion of the annulus, the port being in fluid communication with a test volume created by (a) and (b), the test volume containing a fluid including the formation fluid;
(d) increasing the test volume at a first rate with a volume control device until the test volume pressure falls below formation pressure;
(e) sensing at least one characteristic of the fluid using a test device at least twice while the test volume is being increased at the first rate;
(f) increasing the test volume at an at least one second rate with the volume control device, the at least one second rate being a non-zero rate;
(g) sensing the at least one characteristic of the test volume using the test device at least twice while the test volume is being increased at the at least one second rate; and
(h) determining the at least one parameter of interest of the formation using the at least one characteristic sensed during the first rate and at least one second rate.

2. The method of claim 1 wherein the at least one parameter of interest is selected from a group consisting of (i) permeability, (ii) mobility, (iii) fluid compressibility, (iv) contact points, and (v) pressure.

3. The method of claim 1 wherein the work string is selected from a group consisting of (i) a drill pipe, (ii) a coiled tube and (iii) a wireline.

4. The method of claim 1 wherein extending at least one selectively extendable device is extending at least two expandable packers.

5. The method of claim 1 wherein the first rate is a constant rate.

6. The method of claim 1 wherein the borehole is a non-vertical borehole, the method further comprising orienting the selectively extendable devices and port to include a portion of the borehole wall closest to the surface in the sealed portion of annulus.

7. The method of claim 6 wherein orienting the selectively extendable devices further comprise using an accelerometer to determine orientation of the selectively extendable devices, and adjusting the orientation of the selectively extendable devices until the selectively extendable devices are oriented to a selected direction.

8. The method of claim 1 wherein sensing at least one characteristic of the fluid includes a characteristic selected from the group consisting of (i) pressure, (ii) temperature, (iii) volume, (iv) change in volume, (v) volume change rate, and (vi) compressibility.

9. The method of claim 1 further comprising initiating (c) by issuing a command from a surface location and controlling (c) through (i) using a controller disposed downhole on the work string.

10. A method according to claim 1 wherein increasing the test volume at an at least one second rate further comprises:
(i) decreasing the rate of volume increase by a first factor to a second rate when the test volume pressure falls below formation pressure;
(ii) allowing the test volume to stabilize while continuing to increase the test volume at the second rate;
(iii) decreasing the rate of volume increase by a second factor to a third rate after the test volume pressure stabilizes at the second rate;
(iv) allowing the test volume pressure to stabilize while continuing to increase the test volume at the third rate;
the method further comprising:
(v) holding the test volume constant;
(vi) allowing the test volume pressure to stabilize at the constant volume; and
(vii) sensing the at least one characteristic of the test volume using the test device when the test volume pressure stabilizes at the constant volume.

11. A method according to claim 10 further comprising:
(A) repeating (iii) and (iv) until the test volume pressure increases while sensing the pressure at least twice;
(B) increasing the rate of volume increase by a third factor to at least a fourth rate after the test volume pressure begins to increase; and
(C) allowing the test volume to stabilize while continuing to increase the test volume at the fourth rate.

12. A method for determining formation pressure of a subterranean formation, the formation having a borehole drilled therein traversing a reservoir containing formation fluid at the formation pressure, the method comprising:
(a) conveying a tool into the borehole on a work string, the borehole and work string having an annulus between the borehole wall and work string, the annulus being filled with a fluid;
(b) extending at least one selectively extendable device disposed on the tool to seal a portion of the annulus;
(c) exposing a port to the sealed portion of the annulus, the port being in fluid communication with a test volume created by (a) and (b), the test volume containing the fluid, the fluid including formation fluid;
(d) increasing the test volume at a first rate with a volume control device;
(e) monitoring the pressure of the fluid and volume change rate at predetermined time intervals using a test device at least twice while the test volume is being increased at the first rate;
(f) determining when the test volume fluid pressure falls below the formation pressure;
(g) changing the rate of volume increase from the first rate to a second rate after the fluid pressure in the test volume falls below the formation pressure, the a second rate being a non-zero rate;
(h) allowing the pressure to stabilize at the second rate;
(i) changing the rate of volume increase from the second rate to at least a third rate, the at least third rate being a non-zero rate;
(j) allowing the pressure to stabilize at the at least third rate; and
(k) determine a zero-rate intercept point on a line having a slope and intercept points defined by the monitored stabilized pressures and corresponding rates of (i) through (j), the zero-rate intercept point is indicative of the formation pressure.

13. The method of claim 12 wherein the second rate and at least third rate are based in part on at least one of the test volume pressure change, volume change and temperature.

14. The method of claim 12 further comprising transmitting a command from a surface location to initiate (d) and using a controller disposed downhole on the work string to control (d) through (i).

15. A method for determining formation pressure of a subterranean formation, the formation having a borehole drilled therein traversing a reservoir containing formation fluid at the formation pressure, the method comprising:

(a) conveying a tool into the borehole on a work string, the borehole and work string having an annulus between the borehole wall and work string, the annulus being filled with a pressurized fluid containing the formation fluid;

(b) sealing a portion of the annulus with at least one selectively extendable device disposed on the tool;

(c) exposing a port to the sealed portion of the annulus, the port being in fluid communication with a test volume created by (a) and (b), the test volume containing a fluid including the formation fluid;

(d) determining the pressure of the fluid in the test volume with respect to time using a test device;

(e) increasing the test volume at a first rate with a volume control device until pressure in the test volume falls below the expected formation pressure;

(f) reducing the first rate to a second rate that allows the pressure to rise;

(g) using an estimated value for formation pressure;

(h) determining an early-time average slope using the value from (g);

(i) determining a late-time average slope using the value from (g);

(j) calculating a ratio of early-time to late-time slopes; and (k) updating the estimated value of formation pressure and repeating (g) through (j) until the ratio is substantially equal to one, the ratio substantially equal to one indicating a substantially correct guessed value for the formation pressure.

16. A method according to claim 15 wherein the second rate is zero.

17. An apparatus for determining at least one parameter of interest of a subterranean formation, the formation having a borehole drilled therein traversing a reservoir containing formation fluid under pressure, the apparatus comprising:

(a) a tool conveyable into the borehole on a work string, the borehole and work string having an annulus between the borehole wall and work string, the annulus being filled with a fluid;

(b) at least one selectively extendable device disposed on the tool to seal a portion of the annulus;

(c) a port exposable to the sealed portion of annulus;

(d) a test volume in fluid communication with the port, the test volume containing at least some formation fluid;

(e) a volume control device for varying the volume of the test volume to at plurality of predetermined rates including non-zero rates;

(f) a test device capable of sensing at least one characteristic of the fluid at least twice while the test volume is being increased each of the plurality of rates; and (g) a processor capable of using the at least one sensed characteristic to modify each of the plurality of predetermined rates.

18. An apparatus according to claim 17 wherein the work string is selected from a group consisting of (i) a drill string and (ii) a wire line.

19. An apparatus according to claim 17 wherein the at least one extendable member is a pad sealing element.

20. An apparatus according to claim 17 wherein the at least one extendable member is at least two extendable members.

21. An apparatus according to claim 17 wherein the at least two extendable members are packers.

22. An apparatus according to claim 17 wherein the fluid volume control device includes at least one pump.

23. An apparatus according to claim 22 further comprising a ball screw and stepper motor for controlling the at least one pump.

24. An apparatus according to claim 17 wherein the at least one parameter of interest is selected from a group consisting of (i) pressure, (ii) permeability, (iii) mobility, (iv) fluid compressibility, (v) temperature and (vi) contact points.

25. An apparatus according to claim 17 wherein the at least one sensor is selected from the group consisting of (i) a pressure sensor; (ii) a volume sensor, and (iii) a temperature sensor.

26. An apparatus according to claim 17 wherein the at least one sensor is at least two sensors, the at least two sensors comprising a pressure sensor and a volume sensor.

27. An apparatus according to claim 17 wherein the at least one sensor is at least three sensors, the at least three sensors comprising a pressure sensor, a volume sensor, and a temperature sensor.

28. An apparatus according to claim 17 further comprising:

(i) a first controller disposed at a surface location for initial activation of the volume control device;

(ii) a two way communication system for transmitting test initiation commands downhole and for transmitting data up hole; and (iii) a second controller disposed downhole for determining each of the plurality of rates.

29. An apparatus according to claim 28 wherein the second controller further comprises a processor and an algorithm installed in the processor for computing the formation pressure based on the sensed fluid characteristics.

* * * * *